(12) United States Patent
Ruff

(10) Patent No.: US 6,315,245 B1
(45) Date of Patent: *Nov. 13, 2001

(54) EJECTION SEAT WITH BLAST PROTECTION SYSTEM

(75) Inventor: Stephen Anthony George Ruff, Buckinghamshire (GB)

(73) Assignee: Martin-Baker Aircraft Company, Limited, Near Uxbridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,971

(22) Filed: Apr. 4, 2000

Related U.S. Application Data

(63) Continuation of application No. 09/525,434, filed on Mar. 14, 2000.

(51) Int. Cl.$^7$ .................................................... B64D 25/04
(52) U.S. Cl. ................................. 244/122 AG; 244/241
(58) Field of Search ........................ 244/122 R, 122 AG, 244/121, 141, 160; 280/728.1, 768, 769, 751; 297/664, 665, 687, 688

(56) References Cited

U.S. PATENT DOCUMENTS

| | | | |
|---|---|---|---|
| 3,218,103 | * | 11/1965 | Boyce . |
| 3,623,768 | * | 11/1971 | Capener . |
| 3,713,695 | * | 1/1973 | Von Wimmersperg . |
| 3,981,518 | * | 9/1976 | Pulling . |
| 4,081,156 | * | 3/1978 | Ideskar . |
| 4,508,294 | * | 4/1985 | Lorch . |
| 4,592,523 | * | 6/1986 | Herndon . |
| 4,667,902 | * | 5/1987 | Zenobi . |
| 4,749,153 | * | 6/1988 | Herndon . |
| 5,067,671 | * | 11/1991 | McIntyre et al. . |
| 5,301,903 | * | 4/1994 | Aronne . |
| 5,498,022 | * | 3/1996 | Papendreou et al. . |
| 5,676,393 | * | 10/1997 | Rose . |

* cited by examiner

*Primary Examiner*—Charles T. Jordan
*Assistant Examiner*—Tim Dinh
(74) *Attorney, Agent, or Firm*—Fulwider, Patton, Lee & Utecht, LLP

(57) ABSTRACT

An ejection seat having a blast protection system comprising a blast screen stowed on the ejection seat and deployable to at least substantially envelop an occupant of the seat.

22 Claims, 2 Drawing Sheets

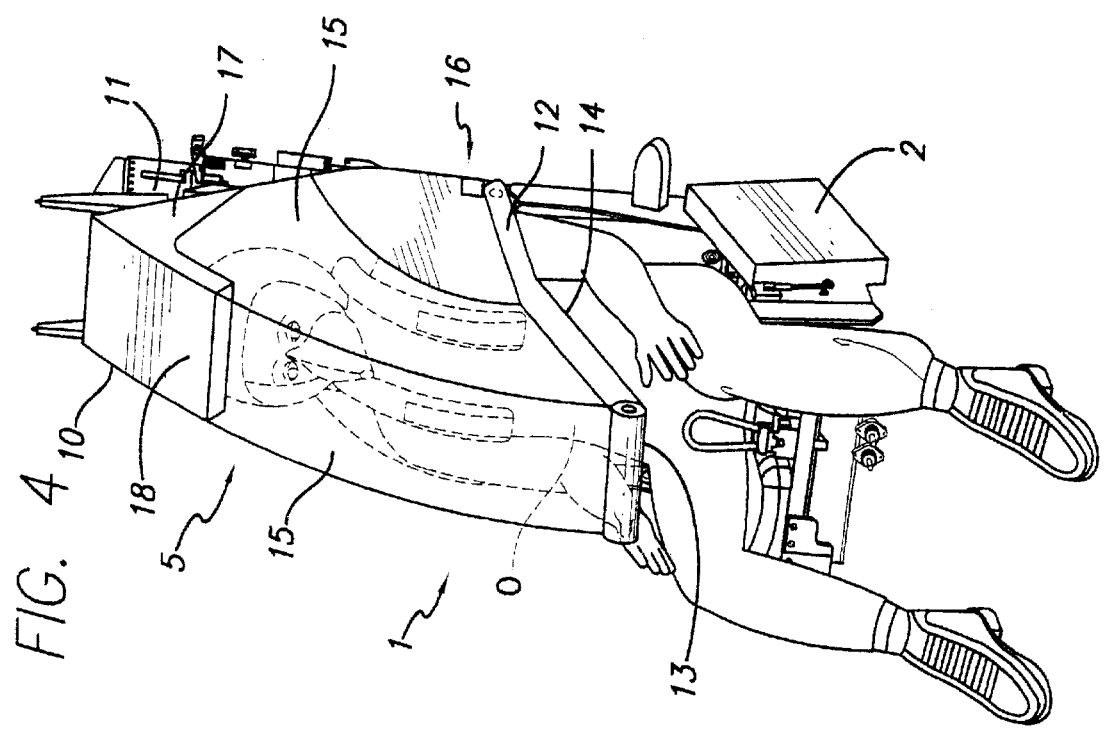
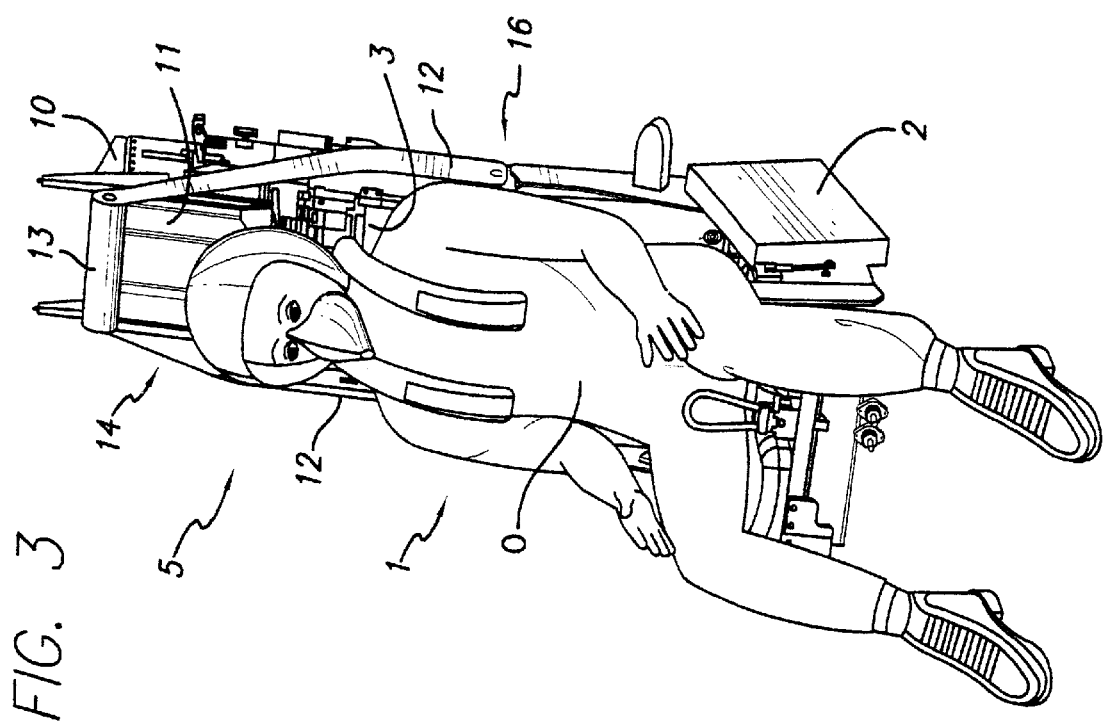

EJECTION SEAT WITH BLAST PROTECTION SYSTEM

RELATED APPLICATIONS

This is a continuation in part of Ser. No. 09/525,434 filed Mar. 14, 2000.

BACKGROUND OF THE INVENTION

This invention relates to an ejection seat and more particularly to an ejection seat having a blast protection system.

Ejection seats are commonly used in military aircraft where the risk of aircraft failure or combat damage is high. Ejection seats allow the aircrew to escape from stricken aircraft and typically provide a safe and reliable means of escape.

Ejection seats have long been fitted with arm and leg restraint systems which serve to secure the arms and legs of the aircrew in a safe position during ejection. During normal flight the aircrew's arms and legs must clearly be allowed to be free in order to control the aircraft. However, during ejection it is important to move the arms and legs of the aircrew into a safe position and secure the arms and legs into that position to avoid injuries which can be caused either by limbs flailing and hitting the side of the cockpit or as a result of the inertial forces which would be experienced by outstretched limbs. As the ejection seat leaves the aircraft, the occupant of the seat experiences wind blast due to the forward speed of the aircraft which will cause further limb flailing if the occupant's limbs are not restrained. As well as injuries to limbs, neck injuries and head injuries are also a hazard. Thus, some ejection seats provide neck restraint systems which secure the head of the aircrew into a safe position during ejection.

One major disadvantage of presently available arm and leg restraint systems and neck restraint systems is that the aircrew are required to don or manually connect themselves to the restraint systems. The difficulty of this task is compounded by the fact that the aircrew are likely to be wearing cumbersome NBC protective clothing. Assistance is therefore usually required in order for the aircrew to be properly connected to the restraint system.

During ejection, the combination of the aircrew and the ejection seat does not present a very aerodynamic profile and therefore suffers from a fairly high coefficient of drag. Thus, the lower the mass of the occupant of the ejection seat, the greater the deceleration which will be experienced during ejection. For this reason, lower mass occupants cannot safely be ejected at high speeds and the escape envelope of higher mass occupants is limited.

It is an object of the present invention to seek to ameliorate or overcome the problems associated with the aforementioned problems associated with ejection seats and restraint systems therefor.

Accordingly, one aspect of the present invention provides an ejection seat having a blast protection system comprising a blast screen stowed on the ejection seat and deployable to at least substantially envelop an occupant of the seat.

Preferably, the blast screen is inflatable.

Advantageously, the ejection seat has two sides and the inflatable blast screen is stowed along one side of the ejection seat for deployment across the front of the ejection seat from the one side toward the other side.

Conveniently, attachment means are provided to attach an edge of the inflatable blast screen to the other side of the ejection seat after deployment.

Preferably, a further inflatable blast screen is stowed along the other side of the ejection seat for deployment across the front of the ejection seat toward the one side.

Conveniently, attachment means are provided to attach an edge of the inflatable blast screen to an edge of the further inflatable blast screen.

Advantageously, the attachment means comprises a hook and loop fastening system.

Preferably, the blast screen is stowed toward the top of the ejection seat for deployment downwardly over the front of the ejection seat from the top of the ejection seat toward the bottom of the ejection seat.

Conveniently, the blast screen is stowed in a container attached to the ejection seat.

Advantageously, the container is provided with a slot through which the blast screen can be deployed.

Preferably, the container is provided with a pre-weakened area which is breakable upon deployment of the blast screen to allow the blast screen to burst through the pre-weakened area.

Conveniently, the blast screen comprises a canopy to enclose at least the upper body of the occupant.

Advantageously, the blast protection system incorporates an inflatable head cover, a portion of the head cover being inflatable between a headrest of the ejection seat and the occupant's head during deployment of the blast protection system.

Preferably, a further portion of the head cover inflates over the occupant's head.

Conveniently, the further portion of the head cover inflates downwardly and forwardly with respect to the ejection seat to initiate deployment of the blast screen over the seat occupant.

Advantageously, the head cover is attached to or comprises part of the blast screen.

Preferably, the blast screen is provided with a frame to provide rigidity to a bottom of the blast screen when the blast screen is deployed.

Conveniently, the frame is inflatable.

Alternatively, the frame is not inflatable.

Advantageously, the frame is pivotally mounted at one end to the seat and is stowed substantially against the seat.

Preferably, the blast screen is attached to the frame and is releasably attached to the seat.

Conveniently, the blast screen is attached to the head cover and the head cover is releasably attached to the seat.

Advantageously, inflation of the head cover initiates deployment of the blast screen.

Preferably, the blast screen includes an inflatable framework which defines the shape of the blast screen and enhances the rigidity thereof.

Conveniently, the inflatable framework comprises a plurality of inflatable ribs.

Another aspect of the present invention provides an ejection seat having a blast protection system comprising an inflatable head cover, a portion of the head cover being inflatable between a headrest of the ejection seat and the occupant's head during deployment of the blast protection system.

In order that the present invention may be more readily understood, embodiments thereof will now be described, by way example, with reference to the accompanying drawings, in which:

FIG. 3 is a perspective view of an ejection seat embodying another aspect of the present invention and an occupant seated in the ejection seat; and FIG. 4 is a perspective view of the ejection seat of FIG. 3 with a blast protection system deployed.

Figure 1:
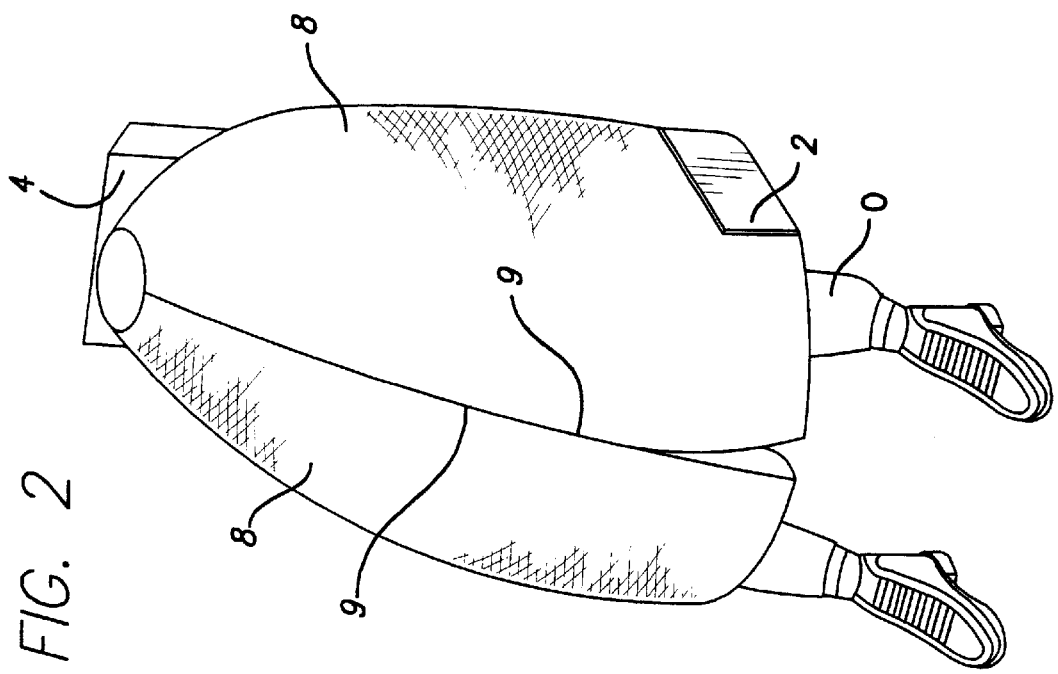
FIG. 1 is a perspective view of an ejection seat embodying the present invention and an occupant seated in the ejection seat.

Referring to FIG. 1, an ejection seat 1 embodying the present invention comprises a substantially horizontal seat portion 2, a reclined, near vertical, back support 3, a head rest 4 and a blast protection system 5. Other than the incorporation of the blast protection system 5, the ejection seat 1 is based upon the design of conventional ejection seats as is the mounting means by which the ejection seat is fitted to the aircraft. An occupant O is shown seated in the ejection seat 1.

In the illustrated example shown in FIG. 1, the blast protection system comprises a pair of elongate containers 6 which are fitted to opposite sides of the ejection seat and which substantially follow the contours of the side of the ejection seat 1, i.e. along the front edge of the seat portion 2, along the horizontal seat portion 2 and then along the back support 3.

The container 6 has an elongate slot 7 formed along its length. With respect to the ejection seat 1, the slot 7 faces forwardly.

Figure 2:
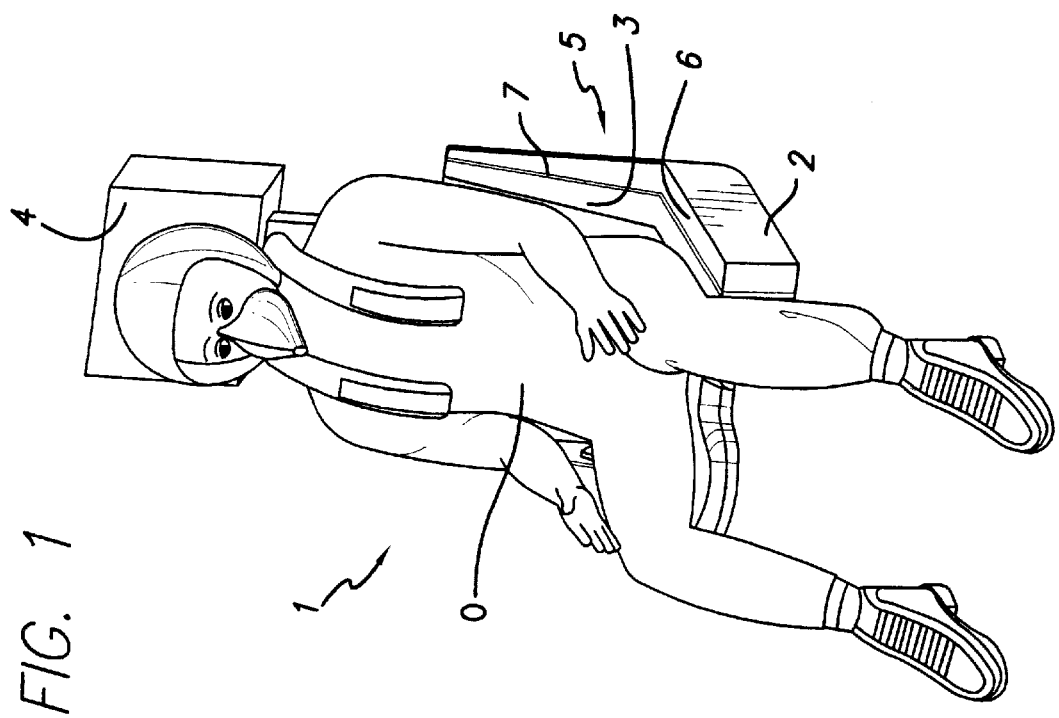
FIG. 2 is a perspective view of the ejection seat of FIG. 1 with a blast protection system deployed.

Referring now to FIGS. 1 and 2, each container 6 includes a pyrotechnic charge, a firing mechanism (not shown) and an inflatable blast screen 8 or curtain. The inflatable blast screen 8 is tightly folded and packed within the container 6 so as to take up the minimum amount of space.

An ejection control system controls the ejection sequence and thus controls the firing of the ejection seat from the aircraft and synchronises removal of the canopy by explosive cutting or other means with the ejection of the seat so as to minimise the possibility of impact between the canopy and the seat occupant. In an ejection seat embodying the present invention, the ejection control system is also operable to send a firing signal to the firing mechanism within each of the containers 6 so that the blast protection system can be deployed during the ejection sequence. The firing signal triggers the firing mechanism in each container 6 thereby igniting the pyrotechnic charge. The pyrotechnic charges rapidly produce combustion gases which fill the respective inflatable blast screens 8 forcing the blast screens 8 out of the respective elongate slots 7 in the containers 6. The blast screens 8 take approximately 20 milliseconds to inflate fully.

In the deployed condition shown in FIG. 2, the blast screens 8 project from the elongate containers 6 and envelop the seat occupant, the leading edges 9 of the two blast screens 8 meeting in the middle. In this manner, the limbs of the occupant and the occupant's head are restrained in safe positions within the blast screens 8 and are protected from injury during the ejection.

The inflatable structure defined by the two blast screens 8 is substantially rigid when inflated. The rigidity of the structure can be improved by incorporating an inflatable framework into the blast screen. Upon inflation, the inflatable framework within the blast screen, including, for example, inflatable ribs, serves to define the shape of the inflatable structure and add strength thereto.

Preferably, the leading edges 9 may also be provided with co-operating attachment means to assist the two edges to remain secured together when the two edges come into contact with one another. For example, a hook and loop fastening system can be used along the edges of the two blast screens 8.

In the above described example, the blast protection system is described as being stowed along the sides of the ejection seat for deployment forwardly and around the occupant of the seat. Other stowage and deployment configurations are possible such as, for example: side stowage in which a single blast screen is deployed from one side only of the seat, preferably for attachment to the opposite side of the seat; and top stowage in which the blast protection system is stowed above the head of the occupant of the seat and can be deployed downwardly as a single blast screen to envelop and protect the occupant.

The top stowage and deployment configuration has an advantage that the blast screen is deployed downwardly as a single unit and thus, during ejection, the flow of air around the inflated structure and the ejection seat would maintain the inflated structure in the correct position around the seat occupant, preventing any limb flailing or neck injury. Furthermore, the top stowage and deployment configuration does not necessitate the edge of a blast screen being deployed having to be attached to the edge of another blast screen or a part of the ejection seat.

FIG. 3 shows another embodiment of the present invention and comprises an ejection seat 1 substantially as described above fitted with a blast protection system 5. The blast protection system 5 comprises an inflatable head cover 10 which, in its undeployed condition, forms part of the seat headrest 11 located behind and above the seat occupant's head. A pair of side arms 12 are pivotally mounted at their bottom ends to respective sides of the seat 1. The side arms 12 extend upwardly along the sides of the seat 1 to the headrest 11 and terminate in a central cross bar 13 which links the free ends of the side arms 12 to one another to provide a pivotable rigid frame 14. The blast protection system 5 also includes a blast screen 15 which is fitted along the rigid frame 14, along the sides of the seat 1 and to the inflatable head cover 10. In its undeployed condition shown in FIG. 3, the screen 15 is stowed around the sides of the seat 1. The blast screen 15 is a single sheet of a flexible composite or possibly a fabric material. The side arms 12 are provided with a non-return mechanism 16 to prevent the frame 14 moving back from a deployed condition to the undeployed condition shown in FIG. 3.

The blast protection system 5 is configured to deploy in the initial stage of ejection and does so by firstly inflating the head cover 10. In its deployed condition, shown in FIG. 4, the inflated head cover 10 has a wedge portion 17 which inflates between the occupant's head and the headrest 11 and a cover portion 18 which inflates over the occupant's head, downwardly and forwardly with respect to the seat. The inflation of the head cover 10 pivots the rigid frame 14 forwardly and downwardly, pulls the blast screen 15 from its stowed condition in the seat sides to create a canopy enveloping the seat occupant and pushes the frame 14 downwardly to its deployed position. The frame 14 is prevented from moving back into its undeployed condition by the non-return mechanism 16. It is envisaged that the deployment of the frame may be aided by providing an actuator at its point of attachment to the seat to drive positively the frame into its deployed position.

The exposed surface area of the cover portion 18 of the head cover 10 which inflates over the occupant's head, downwardly and forwardly, thereby comprises part of the blast screen 15.

The wedge portion 17 of the inflated head cover 10 provides protection for the occupant against the effects of potential head injury resulting from the head impacting against the headrest 11 as the head encounters the wind blast when emerging from the protection of the aircraft cockpit. The deployed blast screen acts as a blast screen or canopy to protect the occupant from wind blast, substantially ameliorates limb flailing by enclosing the occupant's upper body and also provides a more aerodynamic profile to provide a lower coefficient of drag for the resultant structure than that which can be obtained for a conventional combination of an ejection seat and occupant.

Once the occupant has been ejected and the blast protection system has performed its purpose, the head cover 10 and the upper portion of the blast screen 15 are released from the seat 1 but remain secured to the frame 14. The occupant's parachute deploys and the occupant is extracted from the seat through the frame 14. The blast protection system remains attached to the seat, via the frame 14, so as not to foul the deployed parachute.

One variation on this embodiment of the ejection seat is to replace the side arms 12 and central bar 13 of the rigid frame 14 with an inflatable skirt. Rigidity in the skirt is provided by the air pressure within the skirt and may be further enhanced by including a framework of inflatable ribs or channels to define the shape of the frame. Such a frame would be more comfortable for the occupant when being extracted from the seat than the use of side arms 12 and a central bar 13.

The provision of a canopy or inflatable structure around the occupant of the seat also serves to provide a lower coefficient of drag for the resultant structure than that which can be obtained for a conventional combination of an ejection seat and occupant. The reduction in the coefficient of drag of the resultant structure means that lower mass occupants can be more safely ejected at speeds currently deemed unsafe and existing aircrew will have their escape envelope increased.

Rather than using a pyrotechnic charge to produce combustion gases to inflate the blast screen or cause deployment of the canopy, a supply of a compressed low molecular weight gas may be used to improve inflation times. The supply of compressed gas would preferably be incorporated in the container 6 housing the inflatable blast screen 8 such that inflation time is not wasted in moving the gas from the supply of compressed gas to the inflatable blast screen. A pyrotechnic charge could still be used to open the supply of compressed gas.

The container may be provided with a pre-weakened area along its length instead of the slot 7. The pre-weakened area is breakable by the deploying inflatable blast screen to allow the blast screen to burst through the pre-weakened area.

A hinged closure may also be used instead of a slot 7 or pre-weakened area, the closure hinging open to allow the inflatable blast screen to deploy.

The inflated structure which comprises the blast protection system or which deploys the blast protection system may remain inflated or can be intentionally deflated after ejection. In the case where the blast protection system remains inflated, there is the possibility of using the inflated structure as a form of life raft.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An ejection seat having a blast protection system comprising an inflatable head cover, a portion of the head cover being inflatable between a headrest of the ejection seat and the occupant's head during deployment of the blast protection system.

2. An ejection seat according to claim 1, wherein the blast protection system further comprises a blast screen stowed on the ejection seat and deployable to at least substantially envelop an occupant of the seat.

3. An ejection seat according to claim 2, wherein the ejection seat has two sides and the inflatable blast screen is stowed along one side of the ejection seat for deployment across the front of the ejection seat from the one side toward the other side.

4. An ejection seat according to claim 3, wherein attachment means are provided to attach an edge of the inflatable blast screen to the other side of the ejection seat after deployment.

5. An ejection seat according to claim 3, wherein a further inflatable blast screen is stowed along the other side of the ejection seat for deployment across the front of the ejection seat toward the one side.

6. An ejection seat according to claim 5, wherein attachment means are provided to attach an edge of the inflatable blast screen to an edge of the further inflatable blast screen.

7. An ejection seat according to claim 1, wherein the blast screen is stowed in a container attached to the ejection seat.

8. An ejection seat according to claim 7, wherein the container is provided with a slot through which the blast screen can be deployed.

9. An ejection seat according to claim 7, wherein the container is provided with a pre-weakened area which is breakable upon deployment of the blast screen to allow the blast screen to burst through the pre-weakened area.

10. An ejection seat according to claim 1, wherein the blast screen comprises a canopy to enclose at least the upper body of the occupant.

11. An ejection seat according to claim 10, wherein the head cover is attached to or comprises part of the blast screen.

12. An ejection seat according to claim 10, wherein the blast screen is provided with a frame.

13. An ejection seat according to claim 12, wherein the frame is not inflatable.

14. An ejection seat according to claim 12, wherein the frame is pivotally mounted at one end to the seat and is stowed substantially against the seat.

15. An ejection seat according to claim 12, wherein the blast screen is attached to the frame and is releasably attached to the seat.

16. An ejection seat according to claim 12, wherein the blast screen is attached to the head cover and the head cover is releasably attached to the seat.

17. An ejection seat according to claim 1, wherein a further portion of the head cover inflates over the occupant's head.

18. An ejection seat according to claim 17, wherein the further portion of the head cover inflates downwardly and forwardly with respect to the ejection seat to initiate deployment of the blast screen over the seat occupant.

19. An ejection seat according to claim 1, wherein inflation of the head cover initiates deployment of the blast screen.

20. An ejection seat having a blast protection system comprising a blast screen stowed on the ejection seat and deployable to at least substantially envelop an occupant of the seat, wherein the blast screen is inflatable, wherein the ejection seat has two sides and the inflatable blast screen is stowed along one side of the ejection seat for deployment across the front of the ejection seat from the one side toward the other side, and wherein attachment means are provided to attach an edge of the inflatable blast screen to the other side of the ejection seat after deployment.

21. An ejection seat having a blast protection system comprising a blast screen stowed on the ejection seat and deployable to at least substantially envelop an occupant of the seat, wherein the blast screen is inflatable, wherein the ejection seat has two sides and the inflatable blast screen is stowed along one side of the ejection seat for deployment across the front of the ejection seat from the one side toward the other side, wherein a further inflatable blast screen is stowed along the other side of the ejection seat for deployment across the front of the ejection seat toward the one side, and wherein attachment means are provided to attach an edge of the inflatable blast screen to an edge of the further inflatable blast screen.

22. An ejection seat having a blast protection system comprising a blast screen stowed on the ejection seat and deployable to at least substantially envelop an occupant of the seat, wherein the blast screen comprises a canopy to enclose at least the upper body of the occupant, wherein the blast screen is provided with a frame, and wherein the frame is pivotally mounted at one end to the seat and is stowed substantially against the seat.

* * * * *